3,575,809
METHOD OF PRODUCING GUANOSINE BY
FERMENTATION
Teruo Shiro, Shinpachi Konishi, Yoshio Tamagawa, and
Tetsuo Maruyama, Kanagawa-ken, Japan, assignors to
Ajinomoto Co., Inc., Tokyo, Japan
No Drawing. Continuation of application Ser. No.
521,403, Jan. 18, 1966. This application Feb. 27,
1969, Ser. No. 803,052
Claims priority, application Japan, Jan. 18, 1965,
40/2,427
Int. Cl. C12d 13/06
U.S. Cl. 195—28                                    2 Claims

ABSTRACT OF THE DISCLOSURE

Mutants of *Bacillus subtilis* which require adenine, do not require xanthine nor guanine, and produce inosine together with minor amounts of guanosine, if any, can be made resistant to 8-azaguanine, and such modified mutants produce useful amounts of guanosine with only minor amounts of inosine.

---

This application is a continuation of our copending application Ser. No. 521,403, filed Jan. 18, 1966 now abandoned.

The present invention relates to a method of producing guanosine, and more particularly to a method of producing guanosine by fermentation.

The sodium salt of guanosine 5'-monophosphate has a pleasant taste. It can be used as a seasoning material and is readily prepared from guanosine.

We have found that biochemical mutants which vigorously produce guanosine can be induced from inosine-producing mutants of *Bacillus subtilis* which require at least adenine for growth. The new mutants are characterized by their resistance to 8-azaguanine.

The parent strains from which the guanosine producing mutants of the invention are derived are mutants of *Bacillus subtilis* which require at least adenine for growth and produce inosine (Aoki et al., Journal of General Applied Microbiology; 9, 387, 1963). Mutants which require xanthine or guanine in addition to adenine cannot be used as parent strains.

The synthesis of purine nucleotides by the microorganisms with which this invention is broadly concerned has been found to follow the pattern shown below in which glucose is representative of suitable carbon sources, and the following abbreviations have been used:

PRPP_____ 5-phosphoribosyl-1-pyrophosphate.
AICA-RP_____ 5-amino-4-imidazolecarboxamide-
                  riboside-5'-monophosphate.
5'-IMP_____ Inosine 5'-monophosphate.
5'-GMP_____ Guanosine 5'-monophosphate.
5'-XMP_____ Xanthosine 5'-monophosphate.
5'-AMP_____ Adenosine 5'-monophosphate.
ATP_____ Adenosine 5'-triphosphate.
IGP_____ Imidazole glycerophosphate.
RNA_____ Ribonucleic acid.
DNA_____ Deoxyribonucleic acid.

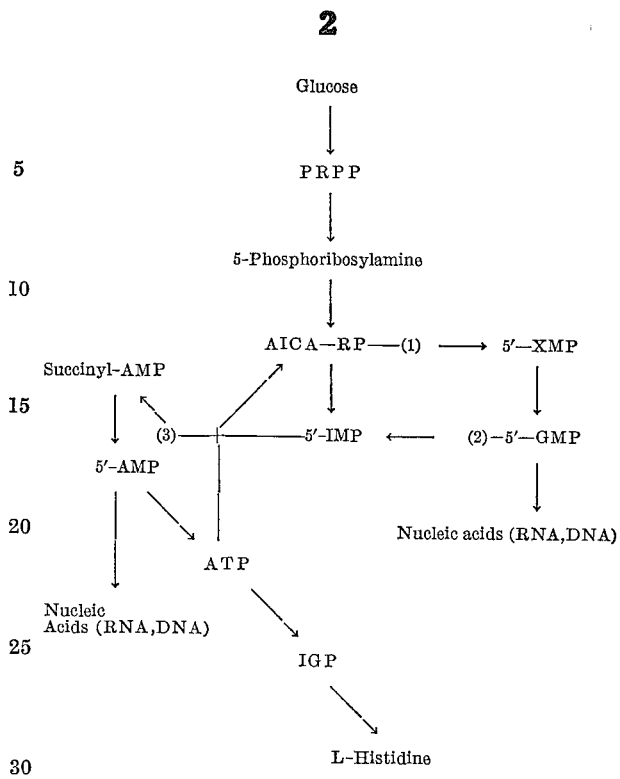

It has been disclosed in U.S. Pat. No. 3,222,257 that adenine and histidine requiring mutants of *Bacillus subtilis* such as strains ATCC Nos. 14660 to 14662 produce a mixture of inosine and guanosine in their culture media. Inosine prevails in the mixture, and the best guanosine accumulation achieved was 3.8 g./l. The mutants of the instant invention produce mixtures of inosine and guanosine in which guanosine prevails, and guanosine may be accumulated in the culture broth in concentrations up to about 8 g./l.

It appears that the known mutants of *B. subtilis* which require adenine for their growth are incapable of the reaction (3), the conversion of 5'-IMP to succinyl-AMP. 5'-IMP therefore accumulates and is hydrolyzed by nucleotidase present in parent strains of *Bacillus subtilis* to inosine which is excreted by the bacterial cells.

We have found that the formation of relatively small amounts of 5'-GMP by the mutants of the afore-mentioned patent is due to inhibition of the reaction (1) by 5'-GMP and its biochemical analogs, the 5'-XMP cannot be produced from the 5'-IMP available when the 5'-GMP present inside of bacterial cells exceeds the limits observed in the earlier method.

We found that 8-azaguanine, a biochemical analog of guanine, can induce guanosine producing strains of *B. subtilis* and that mutants so produced retain the requirement of the parent strain while being insensitive to the accumulating 5'-GMP. The reaction (2), the conversion of 5'-GMP to 5'-IMP reaches an equilibrium in which 5'-GMP prevails since 5'-IMP is not consumed in the formation of succinyl-AMP. 5'-GMP is enzymatically hydrolyzed, and guanosine is excreted from the cells into the culture medium.

Mutants which are resistant to 8-azaguanine may be induced from the parent strains above described by conventional mutant inducing methods. For example, a mutant of *Bacillus subtilis* which requires at least adenine and can produce inosine is inoculated on a nutrient medium containing 300–800 γ/ml. of 8-azaguanine in a dish, cultured at 37° C. for 2 to 4 days, and the strains growing on the medium are isolated. From the strains isolated, the mutants which produce guanosine are selected. Mutants resistant to 8-azaguanine and capable of producing guanosine may also be induced by X-ray radiation, or by treatment with sodium nitrite in a coventional manner. Mutants resistant to 8-azaguanine and capable of producing xanthosine may be obtained in this manner, and from these mutants, guanosine producing mutants can be induced by the same method as above.

The following table shows the results of experimental fermentation by means of known inosine producing mutants and of mutants resistant to 8-azaguanine. The culture medium used consisted of 7 g./dl. glucose, 1.5 g./dl. ammonium chloride, 0.04 g./dl. magnesium sulfate, 0.05 g./dl. potassium dihydrogen phosphate, 0.001 g./dl. ferrous sulfate, 0.001 g./dl. manganese sulfate, 0.08% total nitrogen in the form of soybean protein hydrolysate, 1.2 g./dl. dry yeast and 2.5% calcium carbonate. Each microorganism strain was cultured on the medium at 31° C. for 70 hours with agitation.

| Strain | Nutrient requirement | Resistant to 8-azaguanine | Accumulation, g./l. Insonine | Accumulation, g./l. Guanosine |
|---|---|---|---|---|
| Bacillus subtilis 11726. | Adenine, histidine and arginine. | — | 5.2 | |
| Bacillus subtilis G-9771 (ATCC No. 19221). | do | + | Trace | 4.8 |
| Bacillus subtilis 11201. | Adenine and isoleucine. | — | 12.2 | |
| Bacillus subtilis G-1136A (ATTCC No. 19222). | do | + | 3.1 | 6.7 |

Mutant strain *Baccilus subtilis* G–9771 was derived from *B. subtilis* 11726, and the mutant strain *B. subtilis* G–1136A was derived from *B. subtilis* 11201.

The culture media employed for producing guanosine according to our method may be entirely conventional in other respects. They must contain an assimilable carbon source, an assimilable nitrogen source, and the usual minor nutrients. Suitable carbon sources are glucose, fructose, starch hydrolyzate, and molasses. A nitrogen source may be provided by ammonium salts of inorganic acids, such as ammonium chloride, or by ammonia in aqueous solution or in the gaseous state. Organic compounds, such as amino acids, or protein hydrolyzates may also be used.

Adenine and other substances which are necessary for growth of the mutant should be present in the culture medium.

Organic growth promoting agents and other nutrients which improve the yield and the rate of production of guanosine include amino acids, ribonucleic acid, dry yeast, peptone, casein hydrolyzate, soybean protein hydrolyzate, and corn steep liquor.

The fermentation is carried out between 27° and 37° C. for about 2 to 4 days under aerobic conditions, and the medium is kept slightly acid to slightly alkaline by adding calcium carbonate, sodium hydroxide, potassium hydroxide, ammonia, hydrochloric acid, or sulfuric acid, as needed.

Guanosine, and the inosine produced as a by-product may be identified and analyzed by conventional methods such as paper chromatography by adsorption on ion exchange resin using a borate buffer.

EXAMPLE 1

A culture medium containing 7 g./dl. glucose, 1.5 g./dl. ammonium chloride, 0.04 g./dl. magnesium sulfate, 0.1 g./dl. potassium dihydrogen phosphate, 0.001 g./dl. ferrous sulfate, 0.001 g./dl. manganese sulfate, 0.04% total nitrogen in the form of soybean protein hydrolyzate, and 1.2 g./dl. dry yeast was prepared and adjusted to pH 7.0. 20 ml. batches of the medium were placed in 500 ml. shaking flasks, sterilized at 115° C. for 10 minutes in an autoclave, mixed with 0.5 g. separately sterilized calcium carbonate, and inoculated with *Bacillus subtilis* G–9771. The media were cultured at 30° C. for 74 hours with shaking, and 4.5 g./l. guanosine was found to be produced in the cultured broths together with a small amount of inosine.

Bacterial cells were removed from one liter of the broth by centrifuging together with calcium carbonate, and the clear solution was made slightly acidic. Activated charcoal was added to adsorb the guanosine which was eluted from the charcoal with ethanol containing ammonia (ethanol:28% ammonia:$H_2O$=7:3:10). The eluate containing the guanosine was partly evaporated in a vacuum, the pH of the concentrate was adjusted to 9.5, and it was passed over a column packed with anion exchange resin from which the guanosine was again eluted with borate buffer (0.05 M KCl+0.02 M $K_2B_4O_7$). The eluate was evaporated and 3.8 g. pure crystalline guanosine were obtained.

EXAMPLE 2

A culture medium containing 8 g./dl. starch acid hydrolyzate (glucose equivalent), 1.5 g./dl. ammonium chloride, 0.04 g./dl. magnesium sulfate, 0.1 g./dl. potassium dihydrogenphosphate, 0.001 g./dl. ferrous sulfate, 0.001 g./dl. manganese sulfate, 0.08% total nitrogen in the form the soybean protein hydrolyzate and 0.03 g./dl. adenine was adjusted to pH 7.0 with ammonia and inoculated with *Bacillus subtilis* G–1136A. The medium was cultured at 31° C. for 68 hours with shaking, whereupon 7.2 g./l. guanosine and 6.9 g./l. inosine were found to be produced in the culture broth. From one liter of the broth, 6.3 g. pure crystalline guanosine were obtained.

EXAMPLE 3

A culture medium containing 7 g./dl. glucose, 1.5 g./dl. ammonium chloride, 0.04 g./dl. magnesium sulfate, 0.001 g./dl. ferrous sulfate, 0.001 g./dl. manganese sulfate, 0.4 g./dl. casein hydrolyzate, 1.2 g./dl. dry yeast and 0.08 g./dl. potassium chloride was inoculated with *Bacillus subtilis* G–1136A, and cultured at 30° C. for 70 hours with shaking.

The culture broth contained 6.7 g./l. guanosine and 6.3 g./l. inosine.

EXAMPLE 4

Dry yeast was replaced in the medium of Example 1 by 0.15 g./dl. ribonucleic acid (80% purity). The medium was adjusted to pH 7.0 with potassium hydroxide, inoculated with *Bacillus subtilis* G–1136A, and cultured at 30° C. for about 65 hours. The culture broth contained 7.8 g./l. guanosine and 1.98 g./l. inosine.

We claim:
1. A method of producing guanosine which comprises:
   (a) inoculating an aqueous culture medium containing a source of assimilable carbon, a source of assimilable nitrogen, necessary inorganic salts, organic growth promoting compounds, adenine, and 300 to 800 micrograms of 8-azaguanine per milliliter with an inosine producing strain of *Bacillus subtilis* requiring adenine, but not requiring xanthine or guanine for the growth thereof;
   (b) holding said inoculated medium under aerobic culturing conditions;

(c) isolating the strains of microorganisms growing on said medium;
(d) selecting among the isolated strains a mutant strain capable of producing guanosine when grown on an aqueous culture medium containing a source of assimilable carbon, a source of assimilable nitrogen, necessary inorganic salts and organic growth promoting compounds including a source of adenine;
(e) culturing the selected strain under aerobic conditions on the last-mentioned culture medium until guanosine is accumulated in the same; and
(f) recovering the accumulated guanosine.

2. A method as set forth in claim 1, wherein said mutant strain is *Bacillus subtilis* ATCC No. 19221 or ATCC No. 19222.

References Cited
UNITED STATES PATENTS

| | | | |
|---|---|---|---|
| 3,111,459 | 11/1963 | Motozaki et al. | 195—28(N) |
| 3,298,923 | 1/1967 | Banno et al. | 195—28(N) |

ALVIN E. TANENHOLTZ, Primary Examiner

U.S. Cl. X.R.

195—46, 112